United States Patent [19]

Durrieu et al.

[11] Patent Number: 4,464,057
[45] Date of Patent: Aug. 7, 1984

[54] RECOVERY AND TREATMENT OF VISCOUS PETROLEUM EMULSIONS

[75] Inventors: Marc M. Durrieu, Le Havre; Jean-Pierre Thery, Le Chesnay, both of France

[73] Assignee: Compagnie Francaise des Petroles, Paris, France

[21] Appl. No.: 449,284

[22] Filed: Dec. 13, 1982

Related U.S. Application Data

[63] Continuation of Ser. No. 195,713, Oct. 9, 1980, abandoned.

[30] Foreign Application Priority Data

Oct. 12, 1979 [FR] France .................... 79 25515

[51] Int. Cl.³ .................... B01F 5/06; B01F 13/06; B01F 15/02
[52] U.S. Cl. .................... 366/139; 366/163; 366/176; 366/337; 366/340
[58] Field of Search ............... 366/139, 163, 164, 174, 366/176, 191, 336–340; 138/37–43; 181/264, 268; 252/359 R, 359 D, 358

[56] References Cited

U.S. PATENT DOCUMENTS 626,487   4/1927  Warren ........................ 366/163
3,920,552 11/1975 Elkern ........................ 366/34 D Primary Examiner—Timothy F. Simone
Attorney, Agent, or Firm—Sughrue, Mion, Zinn, Macpeak & Seas

[57] ABSTRACT

Apparatus for use in the treatment and recovery of viscous petroleum emulsions comprises a leaktight chamber in which a reduced pressure is established, the chamber having an inlet connected to a feedpipe for sucking up emulsion. A mixer is connected on the feedpipe and a demulsifier is supplied to the mixer simultaneously with the emulsion so that the emulsion mixed with demulsifier is fed to the chamber.

10 Claims, 6 Drawing Figures

RECOVERY AND TREATMENT OF VISCOUS PETROLEUM EMULSIONS

This is a continuation of application Ser. No. 195,713, filed Oct. 9, 1980.

The present invention relates to apparatus intended for use in the recovery and the treatment of viscous petroleum emulsions, particularly but not exclusively in the case of pollution of the coasts and beaches. After pollution of this kind, the cleaning operations can involve the recovery of the emulsions, which it has become customary to designate by the term "Chocolate Mousse", and which consist of globules of water (discontinuous phase) surrounded by petroleum (continuous phase) in proportions, by volume, of about 60 to 70% of water for 40 to 30% of oil. These emulsions can contain solids, such as sand, pebbles, paraffins, vegetable and animal debris and the like, the presence of which increases the tendency of the emulsions to form stable magmas.

As they are generally very viscous, these emulsions are not very suitable for pumping. Furthermore, during storage and transportation, the latter being carried out by means of lorries, goods trucks or boats, these emulsions solidify and their extraction thus becomes very difficult. Furthermore, it has been found that, during the successive pumping operations, these emulsions become increasingly viscous as a result of losing their volatile products.

It is consequently important to treat the emulsions from the first stage of the recovery, in order, on the one hand, to fluidify them by lowering their viscosity, and, on the other hand, to separate off the water and also the sollid debris so that it is only necessary to transport the recoverable petroleum products.

Attempts have already been made, using makeshift equipment, to treat these emulsions by employing demulsifiers, such as, for example, UNISPERSE 74. However, these attempts have not given convincing results, the equipment used being poorly suited to the needs.

In particular, attempts have been made to pour the chemical demulsifier into a leaktight chamber and then to introduce the emulsion into the chamber by pumping. However, the mixing achieved was inadequate and the result was not very satisfactory.

Attempts have also been made to pour the chemical demulsifier into an open tank in which the emulsion has been collected beforehand, but mixing proved very difficult under these circumstances.

According to the present invention there is provided apparatus for use in the recovery and treatment of viscous petroleum emulsions, comprising a leaktight chamber, an emulsion feedpipe having a downstream end which is connected to said chamber, means for producing a vacuum in said chamber to create therein a reduced pressure for sucking emulsion through said feedpipe, a mixer arranged on said feedpipe, a tank for containing a demulsifier, and an injection pipe connecting said tank to said feedpipe upstream of said mixer such that in use emulsion and demulsifier will be sucked in, automatically and simultaneously, mixed and introduced into said chamber.

An adjustable matering tap may be included in the injection pipe in order constantly to ensure an appropriate injection rate.

The apparatus may be rendered mobile; for example, it can be mounted on wheels, and it may be capable of being mechanically towed or of being drawn by a tractor.

The emulsion feedpipe is advantageously a flexible suction hose.

The self-cleaning static mixer may comprise a tubular element inside which a plurality of transverse baffles, made of a flexible material, are arranged, the said baffles each possessing a surface area capable of blocking part of the cross-section of the tubular element. If the tubular element is approximately horizontal, these baffles are preferably arranged alternately in the upper part and in the lower part of the tubular element. The material of which they are made is preferably sufficiently rigid for them to be able, at rest, to hold themselves in a position approximately perpendicular to the axis of the tubular element.

It is the action of these baffles which ensures the intimate mixing of the demulsifier and the recovered product during the suction stage. It is due to these same baffles that the mixer can be self-cleaning at the same time. In fact, when one of the solid bodies which the recovered product is capable of containing arrives in front of one of these baffles, the baffle moves aside under the thrust of the said body and allows the latter to pass.

The self-cleaning effect of the above described static mixer is further improved by the fact that the baffles are capable of vibrating because of their elasticity, and of doing this under the simple action of the fluid stream passing through the apparatus.

The mixer preferably comprises a rigid tubular body with downstream and upstream connectors for connection to the leaktight chamber and the feedpipe respectively, and with a side inlet for the injection pipe. As regards the metering tap, it is opened each time the leaktight chamber is filled. It is preset so that the ratio of the volume of the demulsifier to the volume of the leaktight chamber is constant, for example of the order of 500 ppm in one case of application.

It should be noted that the recovered product consists of a mixture of variable proportions, which contains, on the one hand, the emulsion to which reference has already been made, and, on the other hand, water, petroleum and some large solid debris, such as pebbles and vegetable and animal debris.

Other features and advantages of the invention will become apparent from the following description of an embodiment thereof, given by way of example only, with reference to the accompanying drawings.

Figure 1:
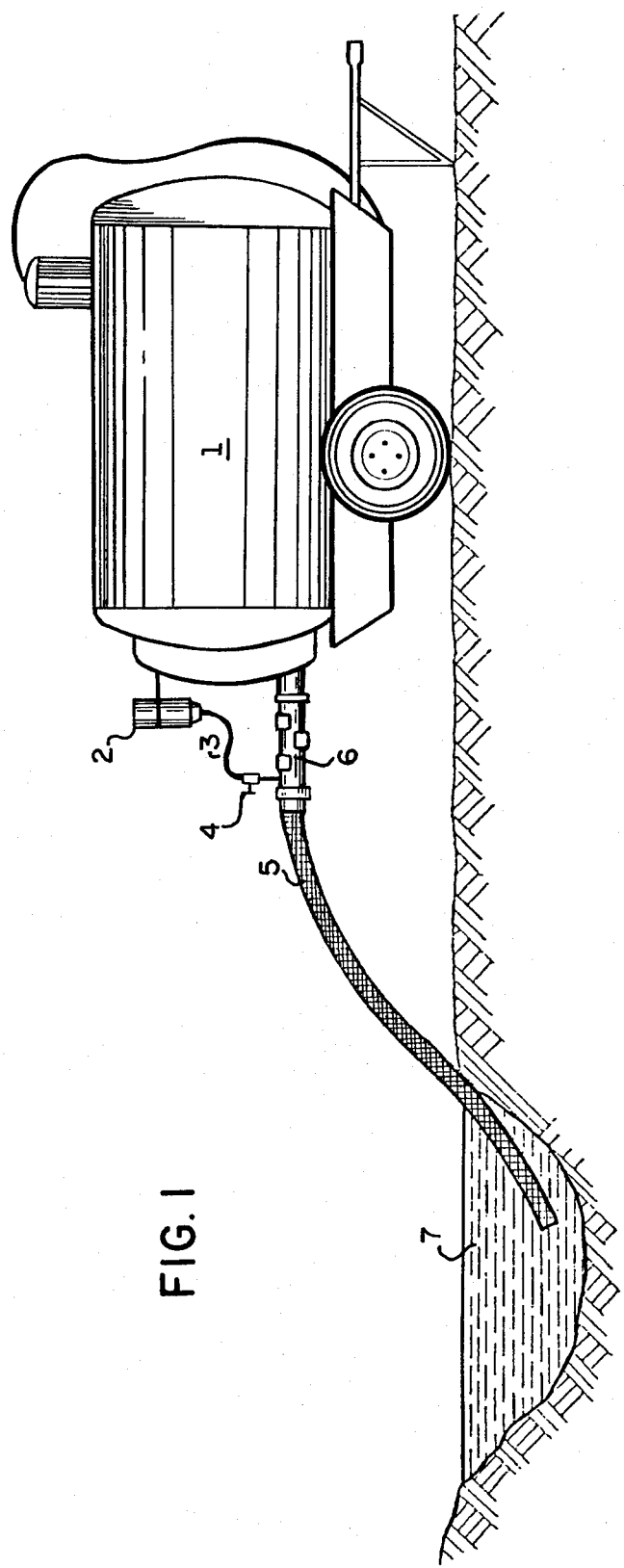
FIG. 1 is a general schematic view of an embodiment of apparatus according to the invention.

The apparatus shown in FIG. 1 comprises a leaktight chamber 1, the shape of which resembles that of a suction tank of the kind employed in agriculture, and a tank 2 for metering/injecting a demulsifying product, which is placed above a flexible suction hose 5 and is connected to the latter by a flexible pipe 3 fitted with a metering tap 4. A deformable static mixer 6 is mounted at the inlet of the leaktight chamber 1, the hose 5 terminating at an upstream inlet and the pipe 3 terminating at a side inlet of the said mixer. Emulsion which is to be recovered is shown at 7.

The suction pump, of a known type is provided for creating a certain vacuum inside the chamber, has not been shown.

Figure 2:
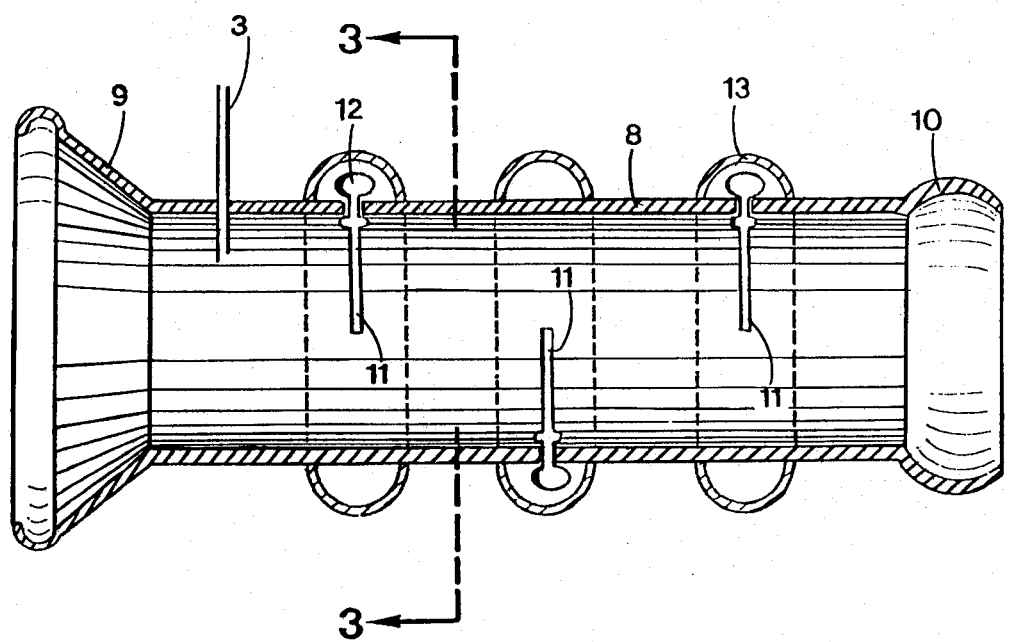
FIG. 2 is a longitudinal section of an embodiment of a self-cleaning, deformable static mixer according to the invention.

FIG. 2 shows the tubular body 8 of the self-cleaning static mixer 6. Connectors 9 and 10 are located at each end of the said body 8, the first of which is intended for detachably connecting the suction hose 5 and the second of which is intended for detachably connecting the mixer to the leaktight chamber 1. Within the body 8, there are a plurality of transverse baffles 11 made of flexible material and each extending over part of the section of the body 8. Each baffle 11 comprises a flange, such as 12, which presses on the periphery of the body 8 from the outside and which constitutes a simple and plain method of fixing each of the baffles in a slot provided in the body for this purpose. Furthermore, the fixing of each of these baffles can be strengthened by means of a collar 13 of the SERFLEX type. The baffles are easy to replace from the outside of the mixer.

Figure 3:
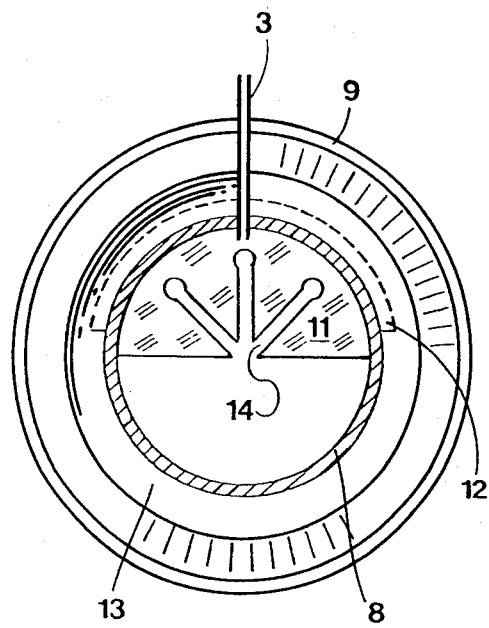
FIG. 3 is a section on the line 3—3 of FIG. 2.

As shown in FIG. 3 each baffle 11 is divided into a number of sectors by means of slots 14.

This arrangement facilitates the elastic displacement of the sector or sectors in question, when a solid body arrives in front of the baffle.

Figure 4:
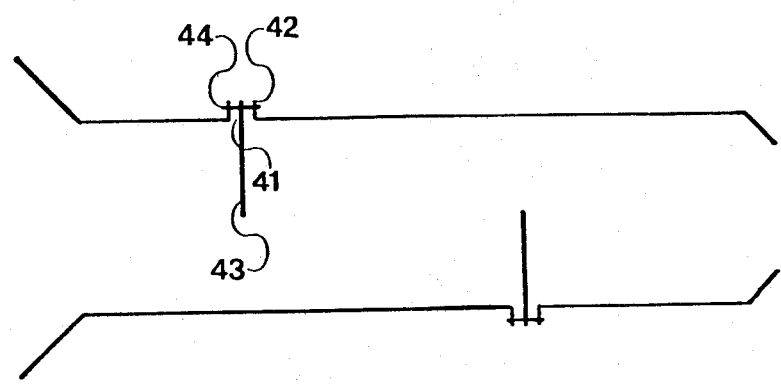
FIGS. 4, 5 and 6 show very schematically other embodiments of self-cleaning static mixers according to the invention.

A modified embodiment of the mixer is shown very schematically in FIG. 4. The body of the mixer is provided with slots 41 with an approximately semi-circular contour, each of these slots having raised edges 42. The baffles 43 are slid into these slots and, when in position, they are fixed to the raised edges 42 by any known means, for example screws or bolts, as shown schematically by 44. It is seen that these baffles are extremely easy to detach from the outside and that, furthermore, they can have very different extra textures and thicknesses, as desired, since the differences which can exist, if appropriate, between the width of the slot and the thickness of the baffle can be made up by means of suitable wedges, which are not shown.

Figure 5:
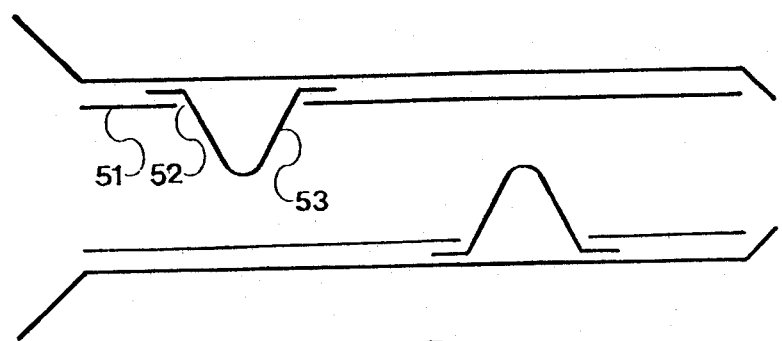

In the modified mixer shown in FIG. 5, in addition to the actual body of the mixer, there is an auxiliary cylinder 51 which is coaxial with the body and which possesses slots 52 over part of its periphery. Elastic sheets, such as 53, are introduced into these slots and arranged as indicated in FIG. 5, so as to constitute baffles. This mounting can take place from the outside, after which it suffices to slide the cylinder 51, comprising the baffle sheets 53, inside the mixer body, and the latter is then ready to operate. For ease of construction, the contour of each baffle could be reduced and only extend over about a quarter circle instead of the half-circumference occupied by the baffles of the previous embodiment.

Figure 6:
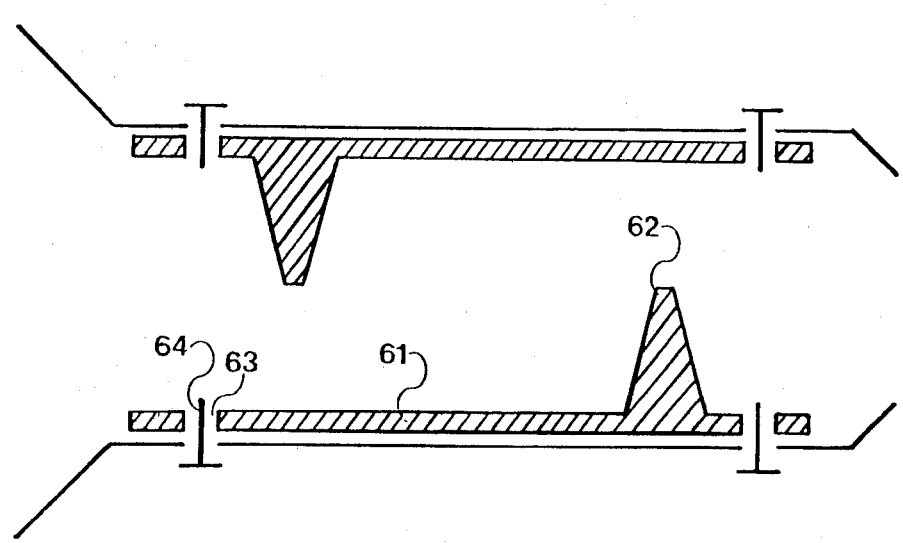

FIG. 6 shows another modified embodiment of a mixer. This mixer comprises, inside the body of the mixer, a set of two moulded pieces 61, each of which is moulded with a plurality of approximately semicircular baffles, such as 62. The elements 61 are fixed to the body of the mixer by any known means, for example screws or bolts, such as 64, which are housed in suitable orifices, such as 63.

A site for the recovery of viscous petroleum emulsions can be organised in the following manner:

The emulsion is first accumulated in trenches or ditches dug directly in the polluted beach.

The leaktight chamber 1 is then brought close to the ditch which it is proposed to treat, and, by virtue of the vacuum which has been produced in the said chamber, a certain amount of emulsion is sucked up and the predetermined amount of demulsifier is also sucked in.

This load is then transported to an intermediate storage point. During the time taken for transportation to the said intermediate storage point, the emulsion breaks up in the chamber and this is followed by the separation of the various phases (water, solid sediments and recovered oil) of this emulsion by settling.

When the contents of the leaktight chamber are discharged, there are two cases to be considered:

If settling is already complete, the water and the oil are poured into two different tanks.

If settling is incomplete, the product should be discharged into a suitable tank in which settling continues; this tank is regularly skimmed and the hydrocarbons thus collected are poured back into another tank intended for containing them.

The water thus collected can be discarded on the polluted site; the solid debris, on the other hand, is collected together.

The result of the treatment is very satisfactory. The water discarded does not contain more than 200 to 300 ppm of hydrocarbons.

The equipment according to the invention has a certain number of advantages. Thus, the sucking-up of the emulsion no longer requires the presence of a matering pump, this sucking-up being achieved automatically by virtue of the vacuum which is produced beforehand in the leaktight chamber, the respective amounts of emulsion and demulsifier being in the desired ratio. The mixing of the demulsifying product and the emulsion itself also takes place without supplying additional energy, by virtue of the use of a static, self-cleaning and deformable mixer apparatus. This apparatus also avoids any clogging during recovery. Furthermore, the baffles of the mixer are very easy to replace in the event of wear, by virtue of the above described method of construction of the apparatus.

Finally, the oily water is discarded immediately on the polluted site without in any way worsening the degree of pollution on this site.

It will be understood that the present invention is not intended to be limited to the embodiments which have been described, because they can always form the subject of modifications of detail without thereby going outside the framework of the invention or exceeding its scope.

There is thus provided rational and efficient apparatus intended to permit the selective treatment of emulsions including petroleum products and to do this, as already explained, as from the first stage of the recovery of the emulsions.

The use of this equipment is easily integrated into the usual course of the operations to be carried out on a shore-cleaning site.

What is claimed is:

1. Apparatus for use in the recovery and treatment of viscous petroleum emulsions, comprising:
   an emulsion feedpipe having a downstream end;
   a mixer arranged on said feedpipe;
   a leaktight chamber larger than said feedpipe and said mixer for permitting the separation, by settling, of components of an emulsion sucked into said chamber, said leaktight chamber being connected to said downstream end of said emulsion feedpipe;
   means for producing a vacuum in said chamber to create therein a reduced pressure for sucking said emulsion through said feedpipe;

a tank for containing a chemical demulsifier; and an injection feedpipe connecting said tank to an upstream end of said mixer such that, in use, emulsion and demulsifier are simultaneously sucked in, mixed, and introduced into said chamber.

2. Apparatus according to claim 1, further comprising an adjustable metering value in said injection feedpipe.

3. Apparatus according to claim 1, wherein said feedpipe comprises a flexible suction hose, and wherein means are provided on said leaktight chamber for moving said chamber.

4. Apparatus according to claim 1, wherein said mixer comprises a rigid tubular body provided with a downstream connector connected to said leaktight chamber, an upstream connector connected to said feedpipe, and a side inlet connected to said injection feedpipe.

5. Apparatus according to claim 1 or claim 4, wherein said mixer comprises a rigid tubular body provided with a plurality of transverse baffles made of a flexible material, said material being sufficiently rigid for said baffles to extend, at rest, in positions approximately perpendicular to the axis of said tubular body.

6. Apparatus according to claim 5, wherein each said baffle extends through a slot in said tubular body, and comprises a flange which bears on said tubular body from the outside thereof.

7. Apparatus according to claim 5, wherein each said baffle of said mixer is provided with radial slots which divide said baffle into a plurality of sectors.

8. Apparatus according to claim 5, wherein each said baffle comprises a flexible sheet which extends through a slot in said tubular body and is fixed to raised edges of said slot.

9. Apparatus according to claim 5, whereifn said baffles extend through slots provided in an auxiliary cylinder which is slid inside said tubular body.

10. Apparatus according to claim 5, wherein said baffles are carried by two semi-cylindrical moulded pieces fixed inside said tubular body.

* * * * *